(12) United States Patent
Tung

(10) Patent No.: US 6,390,128 B1
(45) Date of Patent: May 21, 2002

(54) COLD/HOT WATER SWITCHING/ CONTROLLING VALVE STRUCTURE OF MONO-SPOUT FAUCET

(75) Inventor: Ping-Jung Tung, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 0 days.

(21) Appl. No.: 09/799,539

(22) Filed: Mar. 7, 2001

(51) Int. Cl.⁷ ................................................ F16K 11/06
(52) U.S. Cl. .............................. 137/625.17; 137/625.4; 251/285; 251/288
(58) Field of Search ................................. 251/285, 288; 137/625.4, 625.17

(56) References Cited

U.S. PATENT DOCUMENTS

| | | | | |
|---|---|---|---|---|
| 4,423,752 A | * | 1/1984 | Psarouthakis | 251/288 |
| 4,813,455 A | * | 3/1989 | Iqbal | 137/625.17 |
| 5,010,917 A | * | 4/1991 | Iqbal | 251/288 |
| 5,326,075 A | * | 7/1994 | Goff | 251/285 |
| 5,329,958 A | * | 7/1994 | Bosio | 137/625.4 |
| 5,368,071 A | * | 11/1994 | Hsieh | 137/625.17 |
| 5,402,827 A | * | 4/1995 | Gonzalez | 137/625.4 |
| 5,477,885 A | * | 12/1995 | Knapp | 251/285 |
| 5,967,184 A | * | 10/1999 | Chang | 137/625.17 |
| 6,170,523 B1 | * | 1/2001 | Chang | 137/625.17 |

* cited by examiner

Primary Examiner—Henry O. Yuen
Assistant Examiner—John Bastianelli
(74) Attorney, Agent, or Firm—Bacon & Thomas, PLLC

(57) ABSTRACT

A cold/hot water switching/controlling valve structure of a mono-spout faucet, which includes a valve main body, an adjusting seat, a restricting member, an upper switching/controlling valve, a lower switching/controlling valve, and a switching/controlling seat. The restricting member can be directly taken out for re-adjusting the restricting member to a desired position so as to easily adjust the amount of discharged hot water.

1 Claim, 3 Drawing Sheets

COLD/HOT WATER SWITCHING/ CONTROLLING VALVE STRUCTURE OF MONO-SPOUT FAUCET

BACKGROUND OF THE INVENTION

The present invention is related to a cold/hot water switching/controlling valve structure of mono-spout faucet. The amount of the discharged hot water can be very easily and conveniently performed When upward biasing the faucet handle and placing the handle at a middle position, only the cold water inlet is opened of the lower switching/controlling valve is opened for cold water to flow out. Therefore, when washing hands, the heater will not operate so that the energy is saved to greatly lower cost and the user is protected from being burned.

In a conventional mono-spout faucet, cold and hot water commonly flows out from the spout. Such mono-spout faucet is provided with a switching/controlling valve capable of controlling the temperature of the flowing out water so as to avoid burning of a child or an incautious user. However, such conventional switching/controlling valve still can hardly ensure safety in use of the faucet.

SUMMARY OF THE INVENTION

It is therefore a primary object of the present invention to provide a cold/hot water switching/controlling valve structure of mono-spout faucet. A user only needs to detach the faucet handle and directly take out the restricting member with a point nosed pliers for adjusting the amount of the discharged hot water. Such operation is very easy and convenient to a user.

It is a further object of the present invention to provide the above cold/hot water switching/controlling valve structure of mono-spout faucet. When taking out the restricting member to adjust the amount of discharged hot water, it is unnecessary to shut off the water supply or unscrew the locking collar or loosen the switching/controlling valve. Therefore, the leakage of water is avoided.

It is still a further object of the present invention to provide the above cold/hot water switching/controlling valve structure of mono-spout faucet. When washing hands, a user only needs to upward bias the faucet handle and place the handle at a middle position. Under such circumstance, the hot water inlet of the lower switching/controlling valve is shut up and only cold water will flow out. Therefore, the heater will not operate so that the energy is saved to greatly lower cost. Also, the user is protected from being burned and the safety in use is ensured.

The present invention can be best understood through the following description and accompanying drawings wherein:

DETAILED DESCRIPTION OF THE PREFERRED EMBODIMENT

Figure 1:
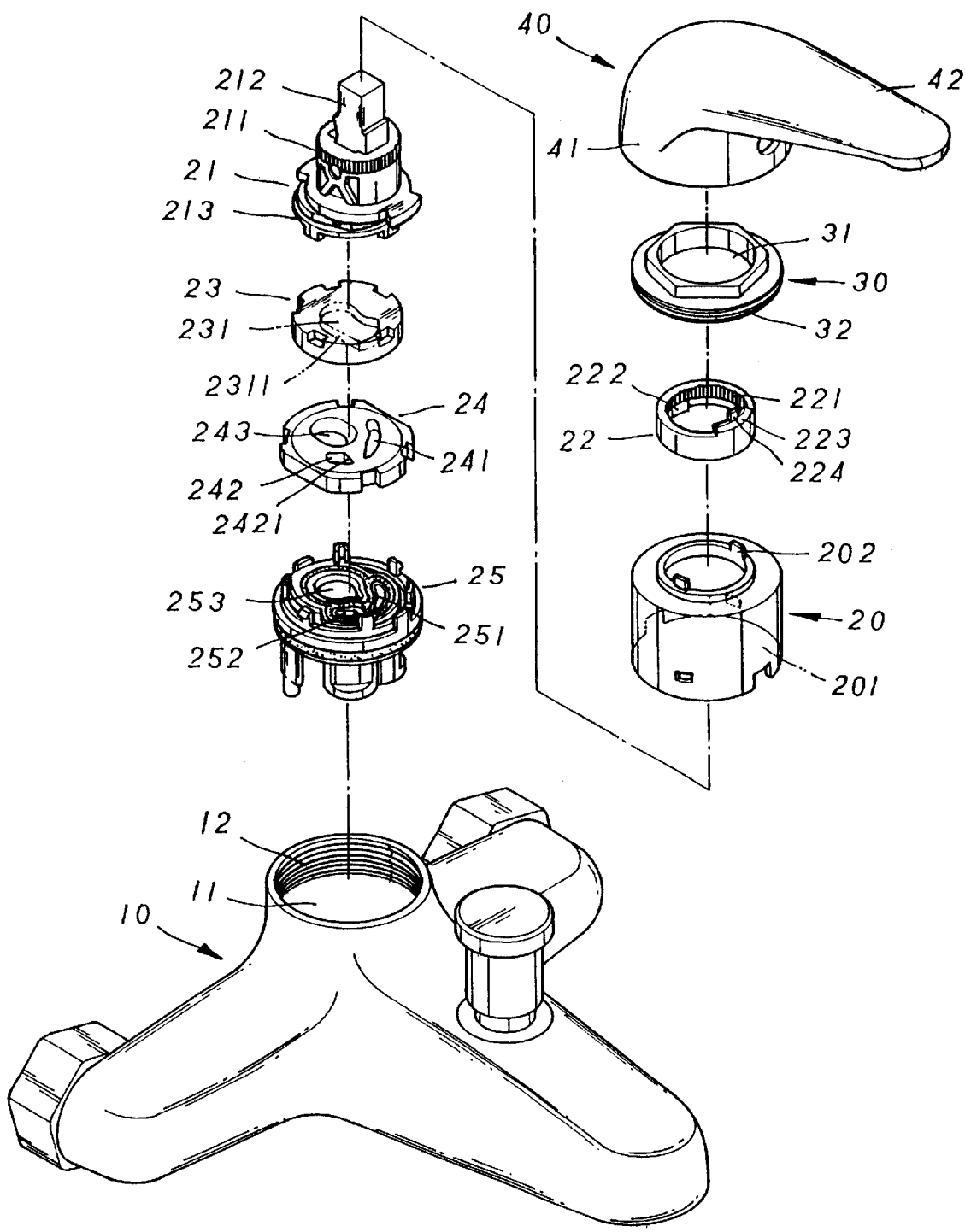
FIG. 1 is a perspective exploded view of the present invention.
Figure 3:
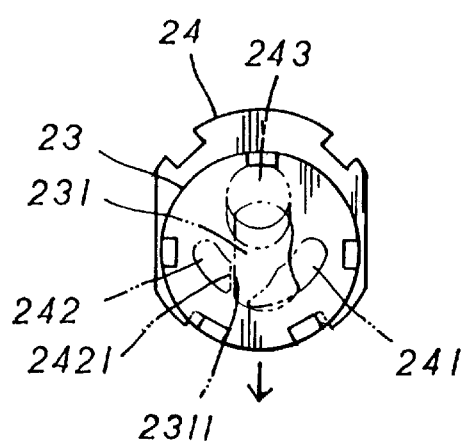
FIG. 3 is a view showing the use of the present invention.

Please refer to FIG. 1. The present invention includes a faucet main body 10, a valve main body 20, an adjusting seat 21, a restricting member 22, an upper switching/controlling valve 23, a lower switching/controlling valve 24, a switching/controlling seat 25, a locking collar 30 and a faucet handle 40. The middle of rear side of the faucet main body 10 is formed with a cavity 11 communicating with internal inlet and outlet water passages. The upper portion of the cavity 11 is formed with inner thread 12. The valve main body 20 is a stepped body formed with a valve chamber 201. The circumference of lower end of the valve main body 20 is cut with several insertion dents and insertion bores. Two sides of the upper end face respectively have two upward projecting stop blocks 202. The circumference of the adjusting seat 21 is provided with multiple outer engaging teeth 211 at equal intervals. A switching/controlling column 212 upward projects from upper side of the adjusting seat 21. The lower end of the switching/controlling column 212 is connected with a linking block 213. Several insertion posts downward project from the circumference of the linking block 213. The restricting member 22 is a ring body. The inner circumference thereof is formed with multiple inner engaging teeth 221 at equal intervals. Two sides of lower end of the restricting member 22 are provided with two downward projecting stop blocks 222. The front side of upper end face has an inward extending slide block 223. The upper end of inner side of the slide block 223 has a projecting drawing plate 224. The circumference of upper side of the upper switching/controlling valve 23 is formed with several insertion dents. The center of bottom face is formed with a longitudinal adjusting slot 231. One side of the adjusting slot 231 slightly outward extends to form an arch face (as shown in FIG. 3). The other side of the adjusting slot 231 is a plane face 2311. The lower switching/controlling valve 24 is slightly larger than the upper switching/controlling valve 23. The circumference of the lower switching/controlling valve 24 is formed with several insertion dents. The front side of the lower switching/controlling valve 24 is formed with a larger arch cold water inlet 241 across the middle. A smaller arch hot water inlet 242 is formed beside the cold water inlet 241 and spaced therefrom by a certain distance. The inner side of the hot water inlet 242 is formed with a plane face 2421. The rear side is formed with a water outlet 243 at the center. Several insertion posts and insertion legs upward project from the circumference of the switching/controlling seat 25. The front side of the switching/controlling seat 25 is formed with cold and hot water inlets 251, 252 corresponding to those of the lower switching/controlling valve 24. The rear side of the switching/controlling seat 25 is formed with a water outlet 253 corresponding to the water outlet 243 of the lower switching/controlling valve 24. Water-sealing rings are laid on the cold and hot water inlets 251, 252 and water outlet 253. The locking collar 30 is formed with a central through hole 31. The outer circumference of the lower section is formed with a locking outer thread section 32. The faucet handle 40 has a head section 41 and a drive section 42 forward extending from the head section 41.

Figure 2:
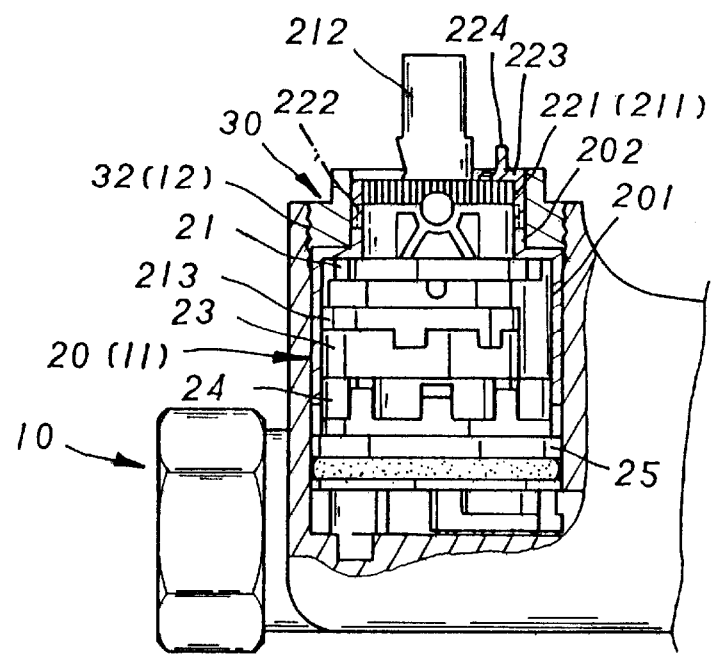
FIG. 2 is a sectional assembled view of the present invention.

When assembled, as shown in FIG. 2, the adjusting seat 21 is inlaid into the valve chamber 201 of the valve main body 20 with the outer engaging teeth 211 protruding beyond the valve main body 20. The insertion posts of the adjusting seat 21 are inserted into the insertion dents of the upper switching/controlling valve 23. Then the lower switching/controlling valve 24 is attached to the upper switching/controlling valve 23. Under such circumstance, the adjusting slot 231 is only mated with and communicated with the water outlet 243 of the lower switching/controlling valve 24, while the cold and hot water inlets 241, 242 are shut up. The insertion posts and insertion legs of the switching/controlling seat 25 are inserted into the insertion dents and insertion bores of the lower switching/controlling valve 24 and the valve main body 20. The restricting member 22 is fitted onto the adjusting seat 21 with the inner engaging teeth 221 drivingly engaged with the outer engaging teeth 211 of the adjusting seat 21. The stop block 222 is positioned a certain position to form a switching/controlling valve. Then, the switching/controlling valve is placed into the cavity 11 of the faucet main body 10 and locked by the locking collar 30. The adjusting seat 21 and the restricting member 22 are right positioned in the through hole 31 of the locking collar 30. The switching/controlling column 212 of the adjusting seat 21 extends out of the through hole 31. Finally, the head section 41 of the faucet handle 40 is locked on the switching/controlling column 21 to complete the assembly.

In use, as shown in FIG. 3, the faucet handle 40 is upward biased to position the drive section 42 at a middle position. The switching/controlling column 212 and the linking block 213 are driven to make the upper switching/controlling valve 23 slide forward. At this time, the plane face 2311 of the adjusting slot 231 is moved forward to attach to the plane face 2421 of the hot water inlet 242 of the upper switching/controlling valve 24 and only the cold water inlet 241 of the lower switching/controlling valve 24 is opened. (The hot water inlet 242 is still shut up.) The cold water flowing out of the cold water inlet 251 of the switching/controlling seat 25 flows to the adjusting slot 231 and flows out through the water outlets 243, 253 of the lower switching/controlling valve 24 and the switching/controlling seat 25 to the outlet passage of the faucet main body 10. When the faucet handle 40 is biased upward and turned leftward (rightward), the restricting member 22 engaged with the adjusting seat 21 is driven to rotate. At this time, the upper switching/controlling valve 23 is slided to left front side (right front side). Therefore, the hot water inlet 242 (cold water inlet 241) of the lower switching/controlling valve 24 is opened, while the cold water inlet 241 (hot water inlet 242) on the other side remains shut up so that only hot water (cold water) will flow out. When the restricting member 22 is rotated, the range of rotation thereof is right the distance between the stop block 222 and the stop block 202 of the valve main body 20. This distance controls the amount of discharged hot water.

Figure 4:
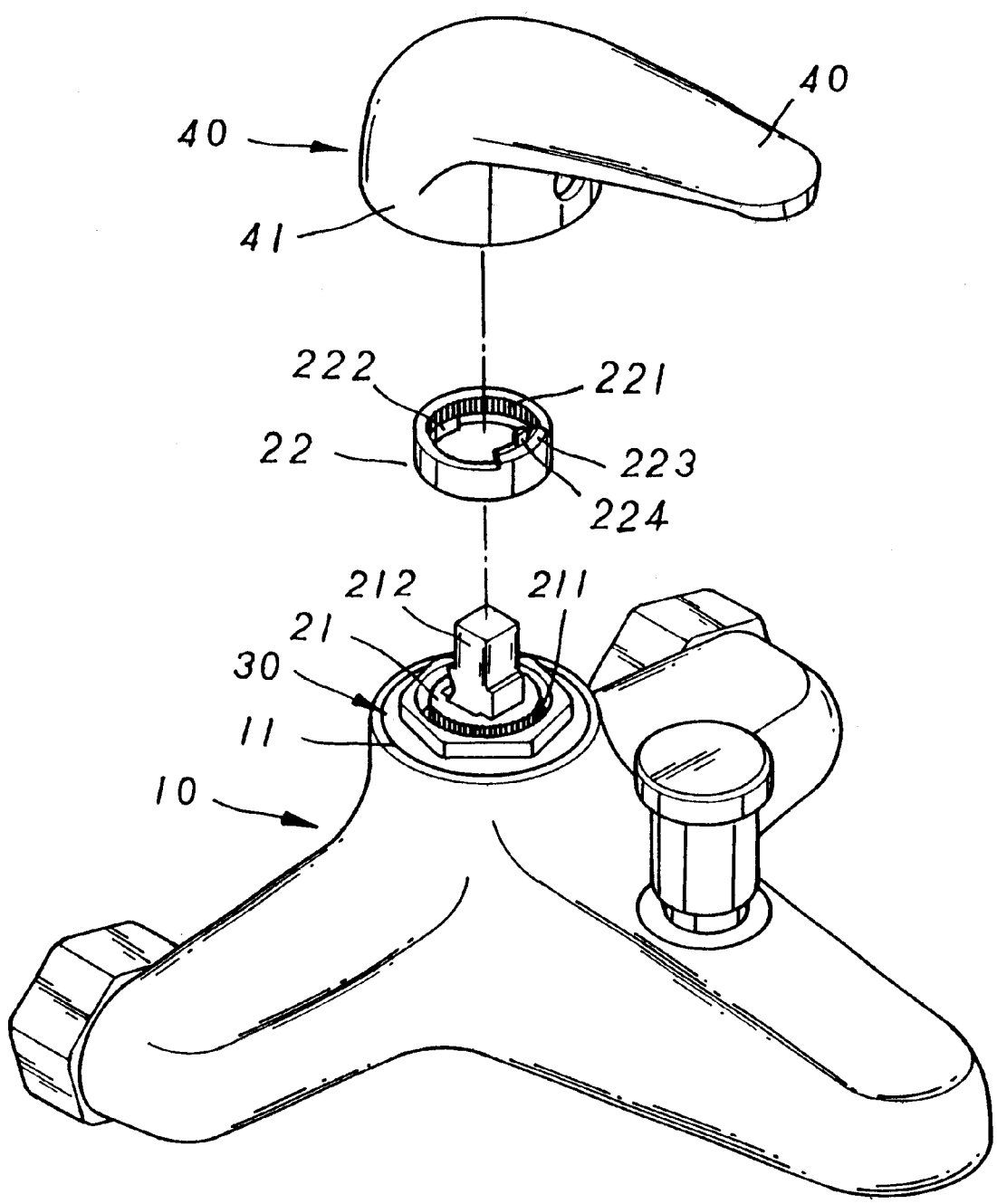
FIG. 4 shows the adjustment of the present invention.

When adjusted, as shown in FIG. 4, the faucet handle 40 is detached. Then, the drawing plate 224 of the restricting member 22, which projects beyond the locking collar 30, is clamped with a point nosed pliers for directly taking out the restricting member 22. After the restricting member 22 is rotated to a desired position, the restricting member 22 is again inlaid and installed back into the faucet handle 40. Accordingly, the amount of discharged hot water can be adjusted.

According to the above arrangement, the present invention has the following advantages:

1. A user only needs to detach the faucet handle 40 and directly take out the restricting member 22 with a point nosed pliers for adjusting the amount of the discharged hot water. Such operation is very easy and convenient to a user.
2. When taking out the restricting member 22 to adjust the amount of discharged hot water, it is unnecessary to shut off the water supply or unscrew the locking collar 30 or loosen the switching/controlling valve. Therefore, the leakage of water is avoided.
3. When washing hands, a user only needs to upward bias the faucet handle 40 and place the handle at a middle position. Under such circumstance, the hot water inlet 242 of the lower switching/controlling valve 24 is shut up and only cold water will flow out. Therefore, the heater will not operate so that the energy is saved to greatly lower cost.
4. When the faucet handle 40 is upward biased and placed at a middle position, only cold water will flowout so that the user is protected from being burned and the safety in use is ensured.

The above embodiment is only used to illustrate the present invention, not intended to limit the scope thereof. Many modifications of the above embodiment can be made without departing from the spirit of the present invention.

What is claimed is:

1. A cold/hot water switching/controlling valve structure of mono-spout faucet, the switching/controlling valve being received in a cavity of a faucet main body and locked by a locking collar, the switching/controlling valve comprising a valve main body, an adjusting seat, a restricting member, an upper switching/controlling valve, a lower switching/controlling valve and a switching/controlling seat, the valve main body being formed with an internal valve chamber, two sides of the end face of the valve main body respectively having two upward projecting stop blocks, the adjusting seat being inlaid in the valve chamber of the valve main body, the circumference of the adjusting seat being provided with multiple outer engaging teeth at equal intervals, a switching/controlling column upward projecting from the side of the adjusting seat for locking with the faucet handle, a lower end of the switching/controlling column being connected with a linking block, the restricting member being a ring body, an inner circumference thereof being formed with multiple inner engaging teeth at equal intervals for drivingly engaging with the outer engaging teeth of the adjusting seat, two sides of lower end of the restricting member being provided with two downward projecting stop blocks, the upper switching/controlling valve being connected to the lower side of the linking block of the adjusting seat and tightly attached to the lower switching/controlling valve, the center of the rear side of the lower switching/controlling valve being formed with a water outlet, the switching/controlling seat being inlaid in the lower side of the lower switching/controlling valve, a front side of the switching/controlling seat being formed with cold and hot water inlets, a rear side of the switching/controlling seat being formed with a water outlet, the locking collar being formed with a central through hole, a circumference of the lower section of the a locking collar being formed with locking outer thread section which is screwed with the inner thread of the faucet main body, said switching/controlling valve structure being characterized in that a front side of upper end face of the restricting member has an inward extending slide block attaching to the outer edge of top face of the adjusting seat, an upper end of the inner side of the slide block having a projecting drawing plate extending out of the upper end of the locking collar, a center of the bottom face of the upper switching/controlling valve being formed with a longitudinal adjusting slot, one side of the adjusting slot slightly outward extending to form an arch face, the other side of the adjusting slot being a plane face, a front side of the lower switching/controlling valve being formed with a larger arch cold water inlet across the middle, a smaller arch hot water inlet being formed beside the cold water inlet and spaced therefrom by a certain distance, an inner side of the hot water inlet being formed with a plane face, whereby the faucet handle can be detached and via the drawing plate, the restricting member can be directly taken-out for re-adjusting the restricting member to a desired position so as to easily adjust the amount of discharged hot water and whereby when washing hands, a user only needs to upward bias the faucet handle and place the handle at a middle position, so that upper switching/controlling valve is slid forward and the plane face of the adjusting slot is attached to the plane face of the hot water inlet of the upper switching/controlling valve and only the cold water inlet of the lower switching/controlling valve is opened for the cold water to flow out.

\* \* \* \* \*